US012671702B2

(12) United States Patent
El-Azzami et al.

(10) Patent No.: US 12,671,702 B2
(45) Date of Patent: Jun. 30, 2026

(54) TAMPERING DETECTION USING A MANAGEMENT CONTROLLER

(71) Applicant: Dell Products L.P., Round Rock, TX (US)

(72) Inventors: Bassem El-Azzami, Austin, TX (US); Richard M. Tonry, Georgetown, TX (US); Christian L. Critz, Liberty Hill, TX (US); Adolfo Sandor Montero, Pflugerville, TX (US); Mohit Arora, Frisco, TX (US); Abeye Teshome, Austin, TX (US); Rajaravi Chandra Kollarapu, Allen, TX (US); Vinodkumar Vasudev Ottar, McKinney, TX (US); Luis Antonio Valencia Reyes, Waxahachie, TX (US)

(73) Assignee: Dell Products L.P., Round Rock, TX (US)

( * ) Notice: Subject to any disclaimer, the term of this patent is extended or adjusted under 35 U.S.C. 154(b) by 146 days.

(21) Appl. No.: 18/649,258

(22) Filed: Apr. 29, 2024

(65) Prior Publication Data

US 2025/0337754 A1    Oct. 30, 2025

(51) Int. Cl.
H04L 9/40 (2022.01)

(52) U.S. Cl.
CPC ...... H04L 63/1416 (2013.01); H04L 63/1425 (2013.01); H04L 63/166 (2013.01)

(58) Field of Classification Search
CPC .................... H04L 63/1416; H04L 63/1425; H04L 63/166
USPC ......................................................... 726/22
See application file for complete search history.

(56) References Cited

U.S. PATENT DOCUMENTS

| | | | |
|---|---|---|---|
| 7,735,122 B1 | 6/2010 | Johnson | |
| 8,042,182 B2 * | 10/2011 | Milani Comparetti | ..................... H04L 63/1408 713/153 |
| 8,615,785 B2 * | 12/2013 | Elrod | ................... H04L 63/0227 713/192 |
| 8,627,467 B2 * | 1/2014 | Levy | ................... H04L 63/0245 726/22 |
| 8,924,620 B2 | 12/2014 | Harriman et al. | |
| 9,215,244 B2 | 12/2015 | Ayyagari et al. | |
| 9,734,169 B2 | 8/2017 | Redlich et al. | |
| 10,079,880 B2 * | 9/2018 | Murphy | .............. H04L 63/0428 |
| 10,176,308 B2 | 1/2019 | Mintz et al. | |
| 10,298,670 B2 | 5/2019 | Ben-Shael et al. | |

(Continued)

*Primary Examiner* — Badri Narayanan Champakesan
(74) *Attorney, Agent, or Firm* — WOMBLE BOND DICKINSON (US) LLP

(57) ABSTRACT

Methods and systems for managing tampering detection for endpoint devices are disclosed. To manage tampering detection, an endpoint device may include an out of band management controller. The management controller may configure a tamper detection device to monitor communications to and from hardware components of hardware resources of the endpoint device while the management controller is inactive. The tamper detection device may compare characteristics of monitored communications to tampering alert criteria and may generate a tampering alert if the monitored communications meet at least a portion of the tampering alert criteria. The tampering alert may initiate interruption of at least the unexpected communication and performance of an action set to remediate an impact of the unexpected communication.

20 Claims, 6 Drawing Sheets

(56) References Cited

U.S. PATENT DOCUMENTS

| | | | | |
|---|---|---|---|---|
| 10,642,998 | B2 * | 5/2020 | Ford | .................... H04L 63/1408 |
| 10,671,765 | B2 * | 6/2020 | Swierk | .................... G06F 21/86 |
| 11,036,902 | B2 | 6/2021 | Nicholas | |
| 11,050,570 | B1 * | 6/2021 | Totah | .................... H04L 9/3215 |
| 11,102,122 | B2 | 8/2021 | Seed et al. | |
| 11,134,380 | B2 | 9/2021 | Fox et al. | |
| 11,250,158 | B2 * | 2/2022 | Ford | .................... G06F 21/6245 |
| 11,487,274 | B2 | 11/2022 | Valder et al. | |
| 11,792,267 | B2 | 10/2023 | Kreiner et al. | |
| 2004/0049699 | A1 | 3/2004 | Griffith | |
| 2009/0106836 | A1 * | 4/2009 | Toshima | .................... H04L 63/10 |
| | | | | 726/22 |
| 2011/0087387 | A1 | 4/2011 | Safa-Bakhsh et al. | |
| 2011/0209216 | A1 * | 8/2011 | Zohar | .................... G06F 16/9535 |
| | | | | 726/22 |
| 2013/0152169 | A1 | 6/2013 | Stuntebeck | |
| 2013/0179954 | A1 | 7/2013 | Bidare | |
| 2016/0036839 | A1 | 2/2016 | Shimizu | |
| 2016/0100315 | A1 | 4/2016 | Schenkel | |
| 2016/0197946 | A1 | 7/2016 | Szekely | |
| 2018/0039946 | A1 | 2/2018 | Bolte et al. | |
| 2018/0124078 | A1 | 5/2018 | Hajmasan | |
| 2020/0112555 | A1 | 4/2020 | Brown | |
| 2020/0244691 | A1 * | 7/2020 | Veeramany | ......... H04L 63/0236 |
| 2021/0034048 | A1 | 2/2021 | Hajizadeh | |
| 2021/0073211 | A1 | 3/2021 | Wright, Sr. | |
| 2022/0038659 | A1 | 2/2022 | Michel | |
| 2023/0072072 | A1 | 3/2023 | Valecha | |
| 2023/0096370 | A1 | 3/2023 | Vaid | |
| 2023/0119649 | A1 * | 4/2023 | Scherer | ............... H04L 63/1433 |
| | | | | 726/1 |
| 2024/0406145 | A1 | 12/2024 | Crabtree | |
| 2025/0141862 | A1 | 5/2025 | Alexander | |
| 2025/0165616 | A1 * | 5/2025 | Cameron | ............. G06F 21/552 |
| 2025/0193019 | A1 * | 6/2025 | Koulouris | ............... G06F 21/52 |

* cited by examiner

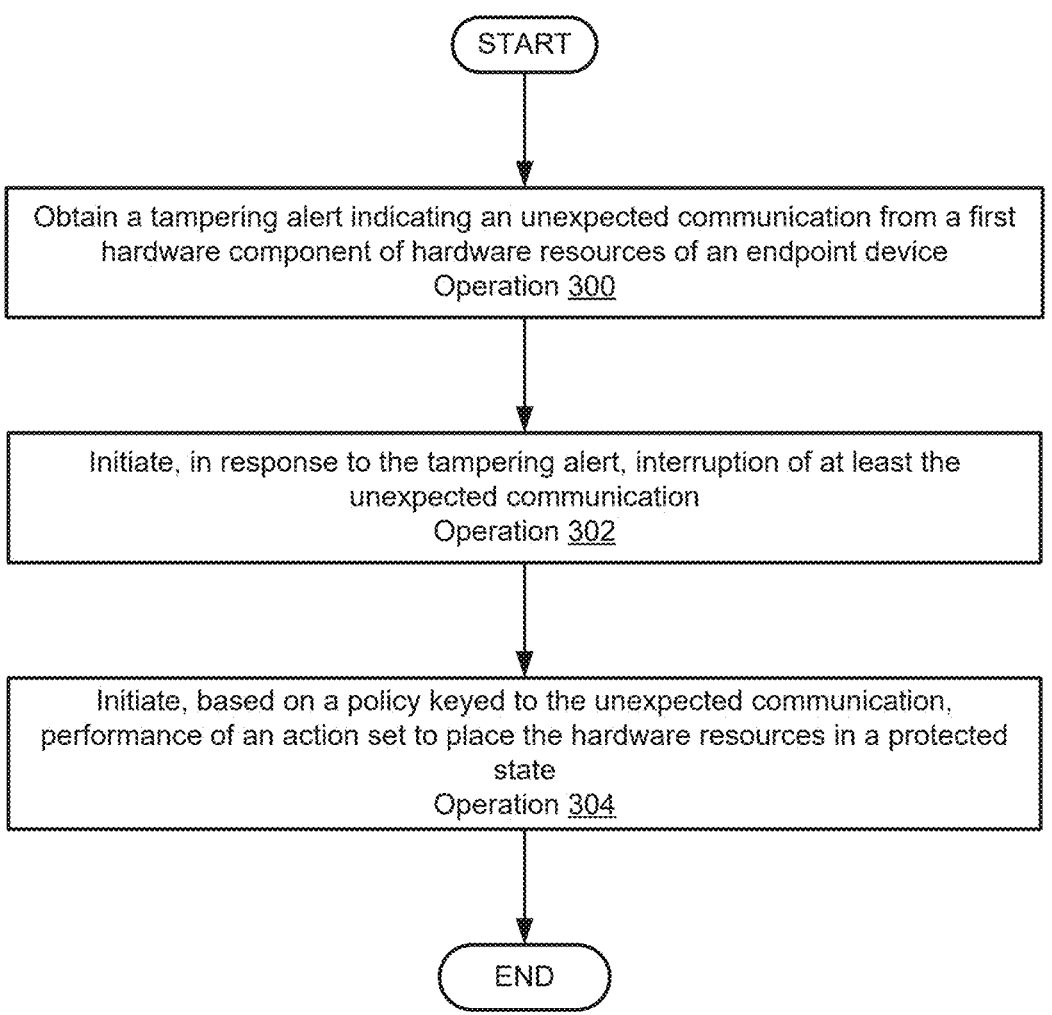

START

Obtain a tampering alert indicating an unexpected communication from a first hardware component of hardware resources of an endpoint device
Operation 300

Initiate, in response to the tampering alert, interruption of at least the unexpected communication
Operation 302

Initiate, based on a policy keyed to the unexpected communication, performance of an action set to place the hardware resources in a protected state
Operation 304

END

FIG. 3

TAMPERING DETECTION USING A MANAGEMENT CONTROLLER

FIELD

Embodiments disclosed herein relate generally to managing tampering detection for endpoint devices. More particularly, embodiments disclosed herein relate to systems and methods to manage tampering detection using a management controller of an endpoint device.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating a method of managing tampering detection for an endpoint device in accordance with an embodiment.

DETAILED DESCRIPTION

Figure 1A:
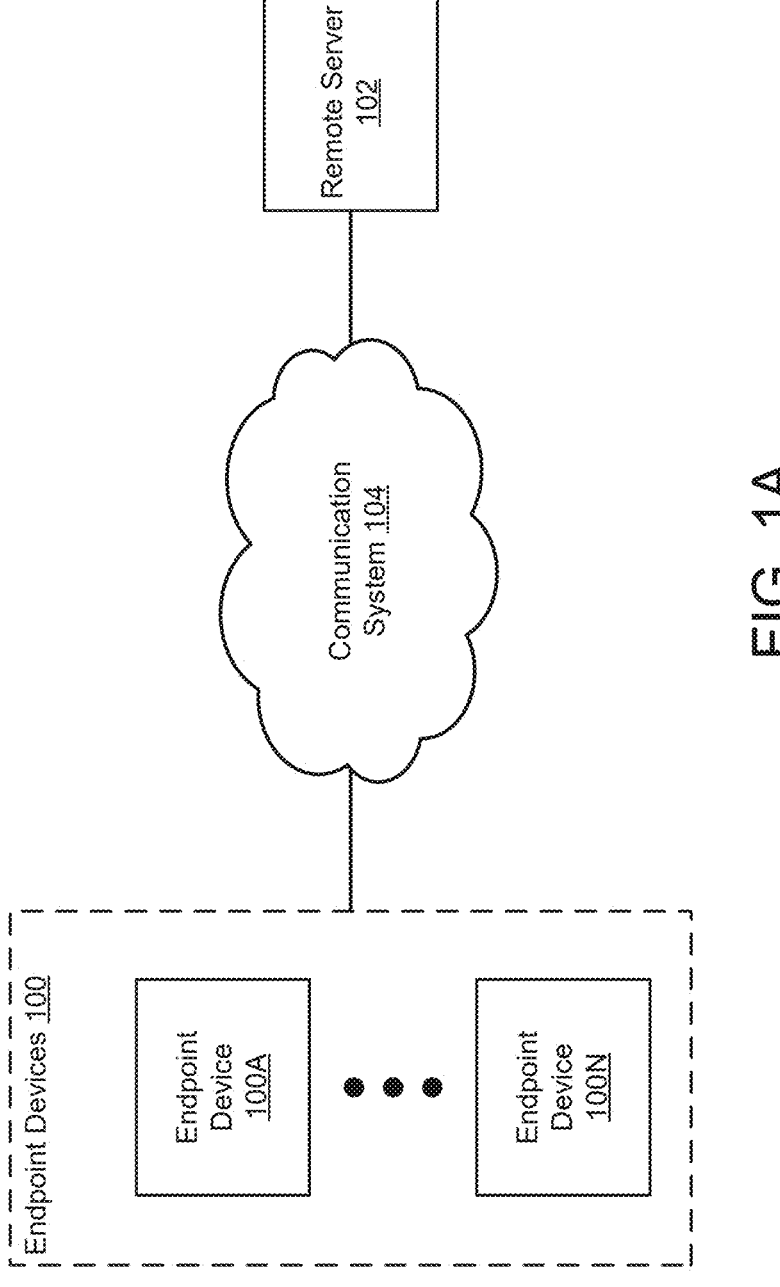
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing endpoint devices. The endpoint devices may provide computer-implemented services. The computer-implemented services may include any quantity and type of such services.

While providing the computer-implemented services, an unauthorized entity (e.g., a malicious entity) may attempt to compromise the endpoint devices (e.g., by physical intrusion, by injection of malware, by providing unauthorized commands to hardware components of the endpoint devices). Compromise of the endpoint devices may lead to non-nominal (e.g., unexpected, undesired) operation of hardware and/or software components of the endpoint devices, unauthorized modifications to configurations and/or other functionalities of the endpoint devices, breach of sensitive data stored by the endpoint devices, etc. Consequently, the computer-implemented services may not be provided as desired, may be interrupted, and/or may become unavailable.

For example, a malicious entity may attempt to compromise an endpoint device by tampering with communications (e.g., commands, instructions) passed between the hardware components of hardware resources of the endpoint device. To do so, the malicious entity may provide a command to a hardware component of the hardware resources (e.g., a battery management entity) masquerading as a trusted hardware component (e.g., a processor). The command may instruct the battery management entity to reconfigure its discharge capabilities. The battery management entity may, therefore, trust the command and may modify configurations and/or otherwise modify its operation. Doing so may negatively impact the computer-implemented services provided by the endpoint device.

To manage an impact of potentially compromised hardware and/or software components on the computer-implemented services, an endpoint device may include a management controller. The management controller may be an out of band component of the endpoint device and, therefore, may utilize a communication channel that does not traverse the potentially compromised hardware resources of the endpoint device. In addition, the management controller may be positioned on a separate power domain from the hardware resources and, therefore, may be operational when the hardware resources are unpowered.

To determine whether a malicious entity has tampered with the endpoint device, the management controller may monitor communications between the hardware components. However, the management controller may not actively monitor all data transmission pathways between the hardware components, may become inactive, and/or may otherwise not monitor a portion of the communications.

To increase a likelihood of identifying unexpected (e.g., potentially malicious) communications between the hardware components, the management controller may manage a tamper detection device. The tamper detection device may be an out of band component of the endpoint device configured to monitor communications between the hardware components. The management controller may manage the tamper detection device via side band channels of the endpoint device and/or via other data transmission pathways that do not include the in band communication channels of the endpoint device. Therefore, the tamper detection device may not be compromised if one or more hardware components of the hardware resources are compromised.

The tamper detection device may monitor communications via: (i) a serial bus communication system of the endpoint device, (ii) a general-purpose input/output (GPIO) communication system, and/or (iii) other communication systems. If an unexpected communication is identified, the tamper detection device may initiate: (i) interruption of at least the unexpected communication, (ii) performance of an action set to remediate an impact of the unexpected communication, and/or (iii) other actions.

Therefore, the tamper detection device may identify unexpected communications between the hardware components without the management controller actively monitoring all data transmission pathways between the hardware components. Doing so may increase a likelihood of identifying instances of tampering by malicious entities (and/or malfunctioning hardware components) thereby increasing a likelihood of providing the computer-implemented services as desired by downstream consumers of the computer-implemented services.

In an embodiment, a method of managing security for an endpoint device is provided. The method may include: obtaining, by a tamper detection device of the endpoint device, a tampering alert indicating an unexpected communication from a first hardware component of hardware resources of the endpoint device, the tamper detection device being: managed by a management controller of the endpoint device, and configured to monitor communications from the first hardware component and to a second hardware component of the hardware resources of the endpoint device; initiating, by the tamper detection device and in response to the tampering alert, interruption of at least the unexpected communication; and initiating, by the tamper detection device and based on a policy keyed to the unexpected communication, performance of an action set to place the hardware resources in a protected state.

The method may also include: prior to obtaining the tampering alert: obtaining, by the management controller of the endpoint device, tampering alert criteria; and providing, by the management controller, the tampering alert criteria to the tamper detection device so that the tamper detection device monitors the communications from the first hardware component and to the second hardware component according to the tampering alert criteria.

The tamper detection device may monitor the communications from the first hardware component and to the second hardware component while the management controller is inactive.

Obtaining the tampering alert may include: making a determination regarding whether characteristics of the unexpected communication match at least a portion of the tampering alert criteria; and in an instance of the determination in which the characteristics of the unexpected communication match at least the portion of the tampering alert criteria: generating the tampering alert.

The tamper detection device may be a serial communication tamper detector configured to monitor communications traversing a serial communication bus of the endpoint device.

The tampering alert criteria may indicate at least one condition selected from a list of conditions consisting of: a threshold of clock counts for the serial communication bus; and a bit pattern associated with a command traversing the serial communication bus.

The tamper detection device may be a general-purpose input/output (GPIO) tamper detector configured to monitor an output pin of a GPIO of the endpoint device.

The tampering alert criteria may indicate an expected output of the output pin of the GPIO.

A first rate of tampering alert criteria violation may indicate interference by a malicious entity and a second rate of tampering alert criteria violation may indicate a defective hardware component of the hardware resources, the first rate of tampering alert criteria violation being higher than the second rate of tampering alert criteria violation.

Initiating performance of the action set may include performing at least one action selected from a list of actions consisting of: logging information related to the unexpected communication; recovering a prior configuration of a hardware component of the hardware resources impacted by the unexpected communication; and reporting the unexpected communication to a remote server.

The endpoint device may include a network module adapted to separately advertise network endpoints for the management controller and hardware resources of the endpoint device, the network endpoints being usable by the remote server to address communications to the hardware resources and the management controller.

The management controller and the network module may be on separate power domains from the hardware resources so that the management controller and the network module are operable while the hardware resources are inoperable.

An out of band communication channel that services the management controller may run through the network module, and an in band communication channel that services the hardware resources may also run through the network module.

The network module may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
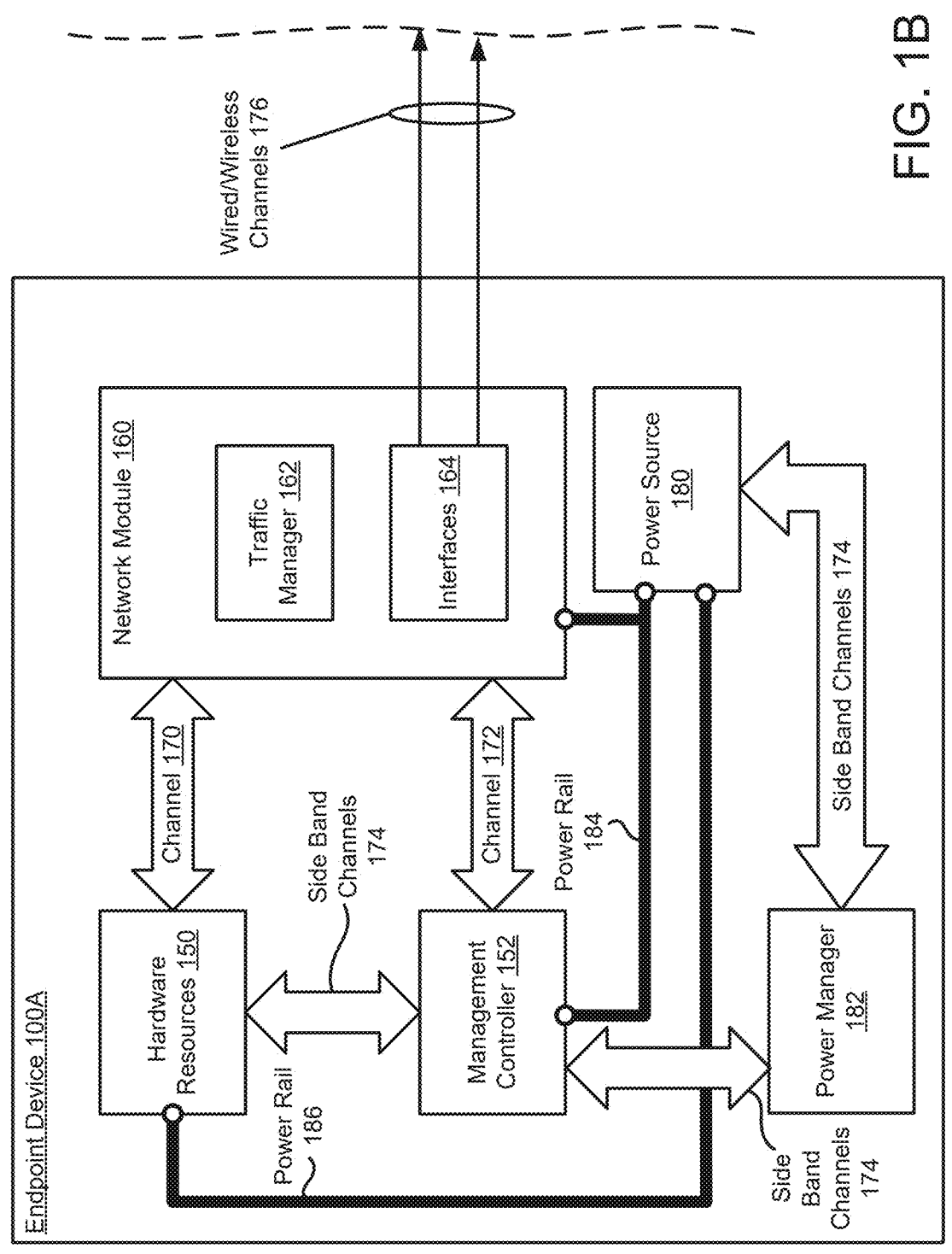
FIG. 1B shows a block diagram illustrating an endpoint device in accordance with an embodiment.

Turning to FIG. 1A, a block diagram illustrating a distributed environment (e.g., system) in accordance with an embodiment is shown. The system shown in FIG. 1A may provide for management of endpoint devices that may provide, at least in part, computer-implemented services. The system may include any number of endpoint devices 100 (e.g., computing devices) that may each include hardware components (e.g., processors, memory modules, storage devices, communications devices). The hardware components may be part of hardware resources of the endpoint devices and may support execution of any number and types of applications (e.g., software components). Refer to FIG. 1B for additional details regarding the endpoint devices.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, endpoint devices 100, remote server 102 and/or any other type of devices (not shown in FIG. 1A). Other types of computer-implemented services may be provided by the system shown in FIG. 1A without departing from embodiments disclosed herein.

To provide the aforementioned computer-implemented services, any of endpoint devices 100 (e.g., 100A, 100N) may need to operate in a predetermined manner. For example, certain hardware components and/or software components of the endpoint devices may need to be operational for endpoint devices 100 to provide a desired type and/or quantity of computer-implemented services.

However, unauthorized entities (e.g., malicious entities) may attempt to compromise an endpoint device (e.g., 100A) to modify operation of the endpoint device and, therefore, manipulate the computer-implemented services. Compromising endpoint device 100A may include a physical intrusion to the endpoint device (e.g., opening a chassis of endpoint device 100A), injection of malware (e.g., to modify operation of software and/or hardware components of endpoint device 100A), providing unauthorized commands to hardware components of the endpoint devices etc.

For example, a malicious entity may provide a command to a hardware component of the hardware resources of endpoint device 100A via an in band communication channel while masquerading as a trusted hardware component of the hardware resources. The command may include instructions to: (i) depower one or more hardware components of the hardware resources, (ii) modify configurations of one or more hardware components of the hardware resources, and/ or (iii) otherwise modify operation of endpoint device 100A. By doing so, the computer-implemented services may be modified, may be interrupted, and/or may become unavailable.

In general, embodiments disclosed herein relate to systems, devices, and methods for managing endpoint devices using out of band methods so that tampering by malicious entities may be detected and remediated regardless of a power or operational state of the endpoint devices. Endpoint devices 100 may include out of band components (e.g., a management controller) that may communicate with remote systems (e.g., remote server 102) without traversing in band communication channels and without utilizing the in band components of endpoint devices 100 (e.g., hardware resources of endpoint devices 100).

However, during operation of endpoint device 100A, the management controller may not actively monitor all data transmission pathways between the hardware components of the hardware resources (e.g., the management controller may be inactive, the management controller may switch between monitoring data transmission pathways) and/or a malicious entity may attempt to override commands provided by the management controller to the hardware components.

As a first example, a management controller may provide a command to power up a hardware component of endpoint device 100A via providing a first signal to a general-purpose input/output (GPIO) and a malicious entity may attempt to override this command (e.g., by providing a second signal to a different voltage level). The second signal may be an unexpected communication that may override the first signal and, therefore, the hardware component may be forced to operate in an undesirable state. The undesirable state may negatively impact the computer-implemented services provided by endpoint device 100A.

As a second example, the management controller may not actively monitor all data transmission pathways (e.g., serial communication buses) of endpoint device 100A simultaneously. While the management controller is inactive on a particular serial communication bus, a malicious entity may extract system data via the serial communication bus, may transmit an unauthorized command (e.g., an unexpected communication) via the serial communication bus, and/or may otherwise utilize the serial communication bus to modify operation of endpoint device 100A. Modifying the operation of endpoint device 100A may negatively impact the computer-implemented services provided by endpoint device 100A.

Figure 1C:
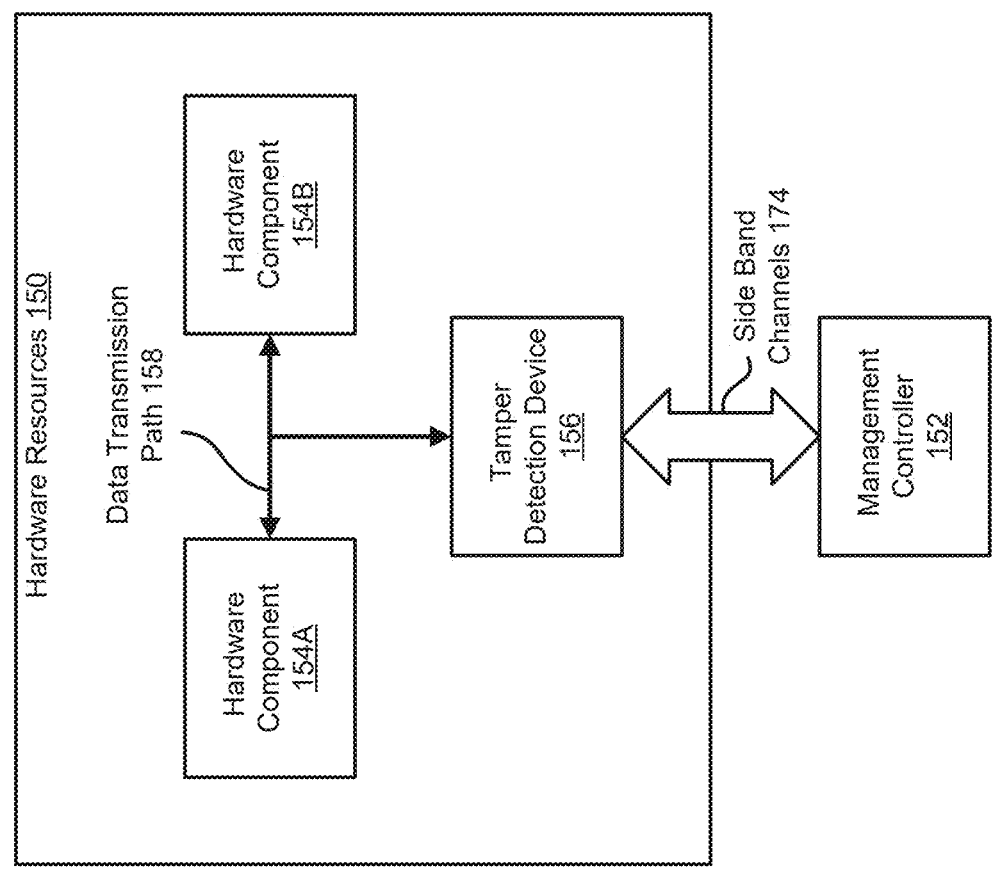
FIG. 1C shows a block diagram illustrating a tamper detection device interacting with hardware resources of an endpoint device and a management controller in accordance with an embodiment.

To manage tampering detection for endpoint device 100A so that unexpected communications may be detected when the management controller is inactive, the management controller may configure a tamper detection device to monitor communications between hardware components of hardware resources of endpoint device 100A. Refer to FIG. 1C for additional details regarding the tamper detection device.

The tamper detection device may be an out of band component of endpoint device 100A and may be managed by the management controller. The tamper detection device may monitor the communications between the hardware components without intervention by the management controller and may generate tampering alerts if at least a portion of a communication (e.g., from a first hardware component of the hardware resources and/or to a second hardware component of the hardware resources) violates tampering alert criteria. The tampering alert criteria may be previously provided to the tamper detection device during configuration of the tamper detection device by the management controller.

Following obtaining the tampering alert, the tamper detection device may initiate interruption of at least the unexpected communication (e.g., the communication that triggered the tampering alert) and may initiate performance of an action set to remediate an impact of the unexpected communication. The action set may be performed based on a policy, the policy indicating actions to be performed that are keyed to different characteristics of the unexpected communication.

Figure 2:
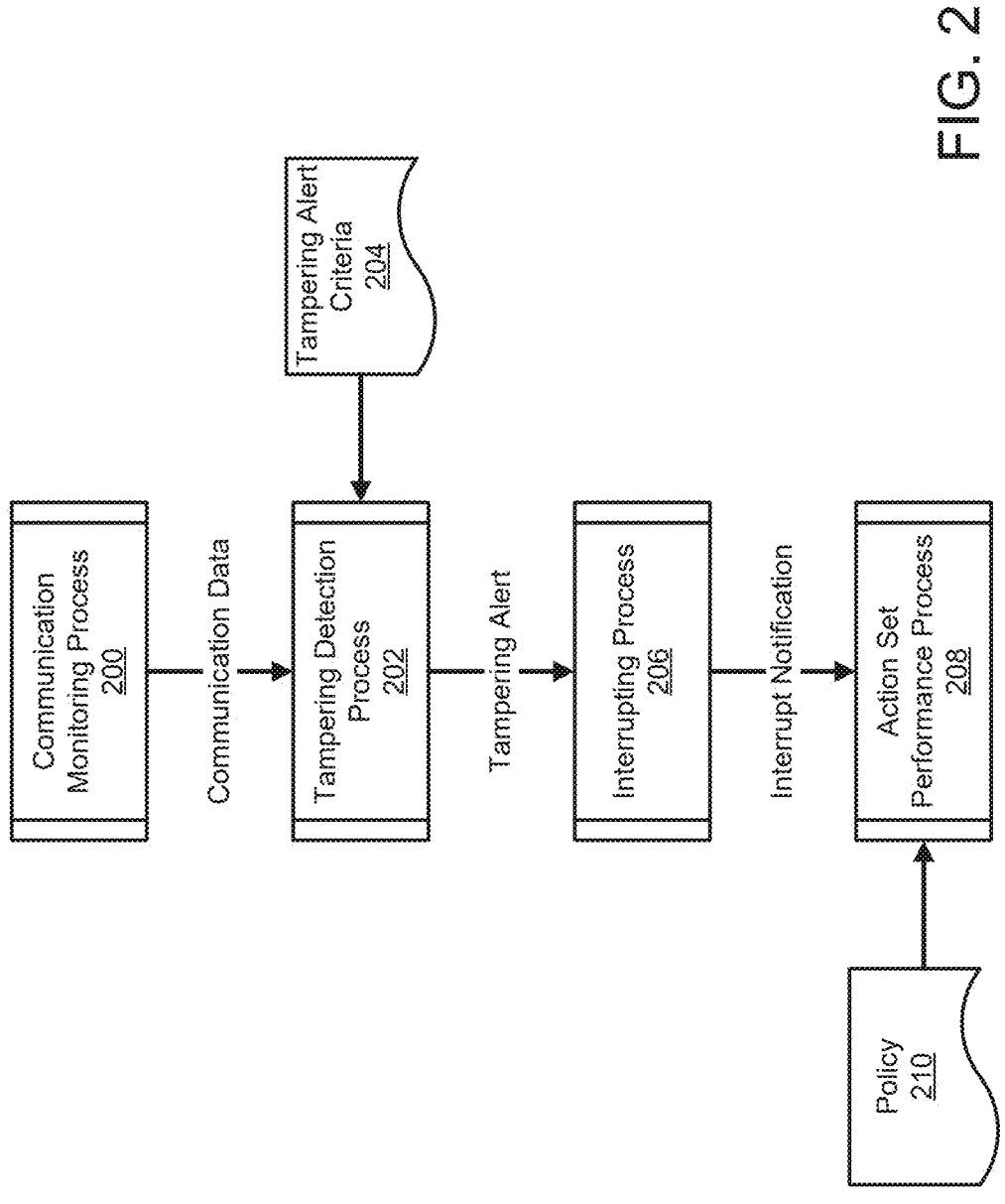
FIG. 2 shows a data flow diagram illustrating management of tampering detection for an endpoint device in accordance with an embodiment.

For example, if an unexpected communication includes a bit pattern consistent with a critical command that is unexpected, performing the action set may include: (i) storing a log associated with the critical command and/or the unexpected communication, (ii) depowering a hardware component to which the critical command was issued and/or from which the critical command was issued, (iii) providing the log to the management controller and/or another entity, and/or (iv) other actions. Refer to FIG. 2 for additional details regarding performing the action set.

To perform the above-mentioned functionality, the system of FIG. 1A may include endpoint devices 100, remote server 102, and/or other components. Endpoint devices 100, remote server 102, and/or any other type of devices not shown in FIG. 1A may perform all, or a portion of the computer-implemented services independently and/or cooperatively. Each of these components is discussed below.

Endpoint devices 100 may include any number and/or type of endpoint devices (e.g., 100A-100N). Any of endpoint devices 100 may include in band components (e.g., hardware resources), out of band components (e.g., a management controller, a tamper detection device) and functionality that may allow the out of band components to interact with remote systems independently from the in band components. For more information regarding in band and out of band components of endpoint devices 100, refer to the discussion of FIG. 1B.

Remote server 102 may be implemented using physical devices located remote to endpoint devices 100 that monitor operation of endpoint devices 100. Remote server 102 may communicate with endpoint device 100A by directing communications to network endpoints associated with the management controller (e.g., via an out of band communication channel) and/or the hardware resources (e.g., via an in band communication channel).

Remote server 102 may monitor instances of tampering and/or unexpected operation for endpoint devices 100. To do so, a management controller of endpoint device 100A, for example, may provide a tampering alert, a forensic report, and/or other information to remote server 102 via an out of band communication channel. Remote server 102 may store this information, may provide instructions to the management controller regarding a response to the tampering, and/or may otherwise monitor operation of endpoint device 100A.

Thus, unexpected communications between hardware components of hardware resources of endpoint device 100A may be managed using out of band methods. A management controller of endpoint device 100A may perform actions to remediate an impact of the unexpected communications on endpoint device 100A thereby improving a quality and/or reliability of the computer-implemented services provided by endpoint devices 100.

When providing their functionality, any of endpoint devices 100, remote server 102, and/or other devices may perform all, or a portion of the methods shown in FIGS. 2-3.

Any of (and/or components thereof) endpoint devices 100, and/or remote server 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of endpoint devices 100 and/or remote server 102 are implemented using an internet of things (IoT) device, which may include a computing device. The IoT device may operate in accordance with a communication model and/or management model known to endpoint devices 100, remote server 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol).

Communication system 104 may be implemented with one or more local communications links (e.g., a bus interconnecting a processor of any of endpoint devices 100 and remote server 102).

Communication system 104 may include out of band communication channels, in band communication channels, and/or other types of communication channels.

Refer to FIG. 1B for additional details regarding the management controller, network module, out of band communication channel, and/or hardware resources of endpoint devices 100.

While illustrated in FIG. 1A as including a limited number of specific components, a system in accordance with an embodiment may include fewer, additional, and/or different components than those illustrated therein.

Turning to FIG. 1B, a diagram illustrating endpoint device 100A in accordance with an embodiment is shown. Endpoint device 100A may be similar to any of endpoint devices 100 described in FIG. 1A.

To provide computer-implemented services, endpoint device 100A may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

Hardware components of hardware resources 150 may communicate with each other via any number and/or type of data transmission pathways (e.g., serial bus communication pathways, GPIOs). Refer to FIG. 1C for additional details regarding data transmission pathways between the hardware components.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of endpoint device 100A) to another device via any number of intermediate networks (e.g., via wired/wireless channels 176 that are part of the networks).

To reduce the downtime of endpoint device 100A and to reduce the likelihood of the applications and/or other in band entities from being indirectly compromised, endpoint device 100A may include management controller 152 and network module 160. Each of these components of endpoint device 100A is discussed below.

Management controller 152 may be implemented, for example, using a system on a chip or other type of independently operating computing device (e.g., independent from the in band components, such as hardware resources 150, of a host endpoint device 100A). Management controller 152 may provide various management functionalities for endpoint device 100A. For example, management controller 152 may monitor various ongoing processes performed by the in band components, may manage power distribution, thermal management, and/or other functions of endpoint device 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may utilize side band channels 174 and/or other data transmission pathways to monitor communications between hardware components of hardware resources 150. Management controller 152 may also configure a tamper detection device (e.g., an out of band component) to monitor communications between the hardware components. By doing so, management controller 152 and/or the tamper detection device may identify unexpected communications (e.g., unexpected commands) sent to and/or received by the hardware components which may indicate tampering by a malicious entity. Refer to FIG. 1C for additional details regarding the tamper detection device.

Management controller 152 may be operably connected to communication components of endpoint device 100A via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted components may not result in indirect compromise of management controller 152, and entities hosted by management controller 152.

To facilitate communication with other devices, endpoint device 100A may include network module 160. Network module 160 may provide communication services for in band components and out of band components (e.g., management controller 152) of endpoint device 100A. For example, network module 160 may host a TCP/IP stack to facilitate network communications via at least an out of band communication channel and an in band communication channel. To do so, network module 160 may include traffic manager 162 and interfaces 164.

Traffic manager 162 may include functionality to (i) discriminate traffic directed to various network endpoints advertised by endpoint device 100A, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Channel 170 may include an in band communication channel that services hardware resources 150 and channel 172 may include an out of band communication channel that services out of band components (e.g., management controller 152). Channel 170 and channel 172 may run through network module 160.

Accordingly, traffic directed to management controller 152 may never flow through any of the in band components. Likewise, outbound traffic from the out of band component may never flow through the in band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a WiFi card, a wireless local area network card, a wired local area network card, an optical communication card, and/or other types of communication components. These components may support any number of wired/wireless channels 176.

Network module 160 (e.g., via interfaces 164) may separately advertise network endpoints for management controller 152 and hardware resources 150. Thus, from the perspective of an external device, the in band components and out of band components of endpoint device 100A may appear to be two independent network entities, that may independently addressable, and otherwise unrelated to one another.

For example, management controller 152 may provide information related to unexpected communications between hardware components to remote entities (e.g., remote server 102) and/or may receive instructions related to managing an impact of the unexpected communications via the out of band communication channel (e.g., 172).

To facilitate management of endpoint device 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, endpoint device 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, endpoint device 100A may perform all, or a portion, of the methods and operations illustrated in FIGS. 2-3.

While illustrated in FIG. 1B with a limited number of specific components, a system may include additional, fewer, and/or different components without departing from embodiments disclosed herein.

Turning to FIG. 1C, a diagram illustrating tamper detection device 156 interacting with hardware resources 150 and management controller 152 in accordance with an embodiment is shown. Hardware resources 150 may include any number of hardware components (e.g., 154A, 154B), each of which may be connected by one or more data transmission paths (e.g., 158).

Hardware component 154A and hardware component 154B may be similar to any of hardware resources 150 described in FIG. 1B. For example, hardware component 154A may be a processor of endpoint device 100A and hardware component 154B may be a memory module of endpoint device 100A. Hardware component 154A may provide commands to hardware component 154B via data transmission path 158. Data transmission path 158 may be any data transmission pathway that may include: (i) a serial bus communication system, (ii) a GPIO communication system, and/or (iii) another type of communication system.

Management controller 152 may monitor communications traveling across data transmission path 158 via side band channels 174, via a direct connection to data transmission path 158, and/or via other methods. However, management controller 152 may not be actively monitoring data transmission path 158 due to being inactive (e.g., asleep), due to monitoring another data transmission path, and/or due to other reasons. When management controller 152 is not actively monitoring communications traversing data transmission path 158, a malicious entity may transmit communications (e.g., directly, via a compromised hardware component) across data transmission path 158. The communications may include commands to modify configurations of hardware and/or software components, to initiate events, extract system data, and/or other commands.

In a first example, hardware component 154A may be a processor and hardware component 154B may be memory module of endpoint device 100A. Data transmission path 158 may be a serial communication bus over which the processor and memory module may send and/or receive communications. A malicious entity may send a command via the serial communication bus to modify sensitive data stored by the memory module. The communication may originate from a compromised hardware component (e.g., the processor) and/or may falsely allege to originate from a trusted hardware component. By doing so, the sensitive data may not be available as expected and, therefore, the computer-implemented services provided by endpoint device 100A may be interrupted and/or may become unavailable.

In a second example, data transmission path 158 may be a GPIO communication system through which a status of a GPIO output pin is read. Hardware component 154A may provide a first signal to the output pin of the GPIO to power up hardware component 154B during a startup process for endpoint device 100A. A malicious entity may attempt to override this command by providing a second signal to the GPIO pin at a different voltage level. By doing so, the malicious entity may, for example, force hardware component 154B to remain unpowered during the startup process which may negatively impact the computer-implemented services.

To detect malicious activity (e.g., tampering) over data transmission path 158 when management controller 152 is inactive (e.g., asleep, monitoring another data transmission path), management controller 152 may configure tamper detection device 156 to monitor communications from hardware component 154A and/or to hardware component 154B.

Tamper detection device 156 may be an out of band component and may include programmable circuitry configured to monitor communications over data transmission path 158. Tamper detection device 156 may be managed by management controller 152 and may communicate with management controller 152 via side band channels 174. Tamper detection device 156 may read communications traversing data transmission path 158 (e.g., by reading electrical signals along data transmission path 158). However, tamper detection device 156 may not trust any in band components and/or in band communications and, therefore, may not be compromised if one or more of the in band hardware resources are compromised.

During configuration of tamper detection device 156, management controller 152 may provide tampering alert criteria and/or other instructions to tamper detection device 156. Refer to FIG. 2 for details regarding tampering detection.

As discussed above, the components of FIGS. 1A-1C may perform various methods to detect tampering by malicious entities for endpoint devices that perform computer-implemented services. FIGS. 2-3 may illustrate examples of methods that may be performed by the components of FIGS. 1A-1C. In the diagrams discussed below and shown in FIGS. 2-3, any of the operations may be repeated, performed in different orders, and/or performed in parallel with or in a partially overlapping in time manner with other operations.

To further clarify embodiments disclosed herein, a data flow diagram in accordance with an embodiment is shown in FIG. 2. In this diagram, flows of data and processing of data are illustrated using different sets of shapes. A first set of shapes (e.g., 204, 210, etc.) is used to represent data structures and a second set of shapes (e.g., 200, 202, etc.) is used to represent processes performed using and/or that generate data.

Turning to FIG. 2, a data flow diagram in accordance with an embodiment is shown. The data flow diagram may illustrate data used in and data processing performed in performing tampering detection for endpoint devices.

Consider a scenario in which a tamper detection device of an endpoint device is configured by a management controller of the endpoint device to monitor communications between hardware components of hardware resources of the endpoint device. The tamper detection device may be: (i) a serial bus communication tamper detector, (ii) a GPIO tamper detector, (iii), and/or (iv) another device.

To monitor the communications between the hardware components, communication monitoring process 200 may be performed. During communication monitoring process 200, communication data may be obtained. The communication data may be obtained by: (i) reading communications traversing a data transmission path between the hardware components, (ii) reading a status of a GPIO output pin, and/or (iii) other methods.

The communication data may include: (i) contents (e.g., bit patterns) of messages transmitted from a first hardware component and/or to a second hardware component, (ii) clock counts associated with the communications, (iii) timestamps for the communications, (iv) a voltage level of the GPIO output pin, (v) a digital control signal for the GPIO, and/or (vi) other information.

To determine whether the monitored communications indicate that a malicious entity has tampered with the hardware components, tampering detection process 202 may be performed using the communication data and tampering alert criteria 204.

During tampering detection process 202, characteristics of the communication data may be compared to tampering alert criteria 204. If the communication data violates (e.g., meets) at least a portion of tampering alert criteria 204, it may be determined that tampering has occurred (e.g., by a malicious entity) for the endpoint device and a tampering alert may be obtained.

In a first example where the tamper detection device is a serial communication tamper detector that monitors a serial bus (e.g., a serial communication bus) of the endpoint device, tampering alert criteria 204 may include: (i) a threshold of clock counts for the serial communication bus, (ii) a bit pattern associated with a command traversing the serial communication bus, and/or (iii) other criteria.

Specifically, the threshold of clock counts may indicate an expected volume of communications over the serial bus and, therefore, an average number of expected clock counts for the transmissions. If the communication data indicates that the number of clock counts meets and/or exceeds the threshold of clock counts indicated by tampering alert criteria 204, the tampering alert may be generated.

The bit pattern associated with the command traversing the serial communication bus may be a bit pattern for a critical command (e.g., to depower a hardware component, to modify critical configurations of the hardware component). The critical command may be unexpected and/or may require validation to be considered expected (e.g., may require validation by a user with authority over the endpoint device). If the bit pattern included in tampering alert criteria 204 is identified in the communication data, the tampering alert may be generated.

In a second example where the tamper detection device is a GPIO tamper detector that monitors an output pin of a GPIO of the endpoint device, tampering alert criteria 204 may include an expected output of the output pin of the GPIO (e.g., an expected voltage level). The expected output may be static and/or dynamic and tampering alert criteria 204 may be updated over time to indicate expected outputs of the GPIO over time.

During tampering detection process 202, it may be determined whether the violation of tampering alert criteria 204 indicates: (i) interference by a malicious entity, (ii) a malfunction by a hardware component of the endpoint device, and/or (iii) other events. To do so, a rate of violation of tampering alert criteria 204 may be compared to any number of thresholds included in tampering alert criteria 204.

For example, a first rate of tampering alert criteria violation may indicate interference by a malicious entity and a second rate of tampering alert criteria violation may indicate a defective hardware component of the hardware resources. The first rate of tampering alert criteria violation may be higher than the second rate of tampering alert criteria violation. Specifically, a defective hardware component may send digital control signals that contradict an intended output of the GPIO occasionally (e.g., meeting the second rate of tampering alert criteria violation) and a malicious entity may repeatedly and/or frequently send digital control signals that contradict an intended output of the GPIO (e.g., meeting the first rate of tampering alert criteria violation.

Therefore, the communication data may include any amount of data related to any number of communications traversing the data transmission path over a duration of time. Tampering alert criteria 204 may include any number of thresholds with a first threshold corresponding to the first rate of tampering alert criteria violation and a second threshold corresponding to the second rate of tampering alert criteria violation.

To determine whether unexpected communications indicate potentially malicious activity, a number of instances of tampering alert criteria violation (e.g., an output of the GPIO output pin not matching an expected output of the GPIO output pin) may be calculated for a duration of time and a rate of tampering alert criteria violation may be determined. The rate of tampering alert criteria violation may be compared to the thresholds included in tampering alert criteria 204 to identify whether the unexpected communications indicate a faulty hardware component (e.g., via meeting the second threshold) or a malicious entity (e.g., via meeting the first threshold).

If the rate of tampering alert criteria violation meets the first threshold, the tampering alert may be generated. The tampering alert may include a notification of potential malicious activity, may include a log of information related to the communication(s) that triggered the tampering alert (e.g., the unexpected communications), and/or may include instructions to perform an interrupt process.

If the rate of tampering alert criteria violation meets the second threshold, other actions may be performed to investigate and/or remediate the malfunctioning hardware component.

To respond to the tampering alert, interrupting process 206 may be performed. During interrupting process 206, an interrupt request may be provided (e.g., to a microcontroller of the tamper detection device,) and an interrupt service routine (ISR) may run. Running the ISR may include executing instructions to pause one or more processes being performed by the tamper detection device (e.g., monitoring communications, logging monitored communications) to switch from a standard operating mode for the tamper detection device to a malicious activity handling mode for the tamper detection device. During interrupting process 206, the tamper detection device may generate an interrupt notification, the interrupt notification indicating that the tamper detection device may be prepared to respond to potentially malicious activity.

To respond to the tampering alert, action set performance process 208 may be performed. During action set performance process 208, policy 210 may be obtained. Obtaining policy 210 may include querying a policy database (not shown) for a policy keyed to a type of the unexpected communication (e.g., a specific bit pattern, a clock count threshold violation), and/or other methods.

Policy 210 may be a data structure including a list of actions to be performed. The list of actions may include: (i) logging information related to the unexpected communication, (ii) recovering a prior configuration of the hardware component, (iii) reporting the unexpected communication to a remote server, and/or (iv) other actions.

Therefore, during action set performance process 208, an action set may be obtained from policy 210 and the actions included in the action set may be performed. Performing the actions included in the action set may place the hardware resources of the endpoint device in a protected state. For example, a log of a tampering event may be generated. The log may include any type and/or quantity of information including: (i) a type of violation of tampering alert criteria 204, (ii) a timestamp associated with the unexpected communications that triggered the tampering alert, (iii) an identifier for policy 210, (iv) contents of the unexpected communications that triggered the tampering alert, and/or (v) other information.

If the unexpected communication(s) that triggered the tampering alert included a command to modify a configuration of a hardware component, action set performance process 208 may include retrieving a previous version of the configuration and restoring the previous version of the configuration. For example, the command may include instructions to modify discharge capabilities by a battery management entity. Restoring the previous version of the configuration may include overriding the command (e.g., providing a new command, providing a notification to disregard and/or revert to the previous configuration) by instructing the battery management entity to restore previous battery discharge capabilities.

Policy 210 (and/or another rule set for responding to tampering) may indicate that a remote entity (e.g., remote server 102 described in FIG. 1A) is to be notified of any identified tampering. The log of the tampering event may be provided to the remote entity via out of band methods. For example, the tamper detection device may provide the log of the tampering event to a management controller of the endpoint device via a side band communication channel and the management controller may utilize an out of band communication channel to provide the log of the tampering event to the remote entity. By doing so, the log of the tampering event may not traverse the in band components of the endpoint device and, therefore, may be more likely to be successfully provided to the remote entity if the hardware resources of the endpoint device are depowered and/or compromised.

The remote entity may manage the tampering by: (i) storing the log of the tampering event, (ii) providing instructions to an entity responsible for performing action set performance process 208, and/or (iii) performing other actions.

By configuring the tamper detection device to monitor data transmission pathways between the hardware components, potentially malicious activity may be detected when the management controller is inactive on a particular data transmission pathway. Thus, a likelihood of timely detection and remediation of potentially compromised hardware components of the endpoint devices may be increased thereby increasing a likelihood of providing the computer-implemented services as desired.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2 may perform various methods to manage unexpected communications for endpoint devices using out of band methods. By doing so, a quality and/or reliability of the computer-implemented services may be increased.

Turning to FIG. 3, a flow diagram illustrating a method of managing tampering detection for an endpoint device in accordance with an embodiment is shown. In the diagram discussed below and shown in FIG. 3, any of the operations may be repeated, performed in different orders, and/or performed in parallel with or in a partially overlapping in time manner with other operations. The method described with respect to FIG. 3 may be performed by an endpoint device, any component of an endpoint device (e.g., a management controller, hardware resources, a tamper detection device), a remote server, and/or another device.

To detect tampering for an endpoint device, a management controller of the endpoint device may configure a tamper detection device to monitor communications from a first hardware component of hardware resources of the endpoint device and to a second hardware component of the hardware resources of the endpoint device. The tamper detection device may be managed by the management controller and configuring the tamper detection device to monitor the communications may include: (i) obtaining tampering alert criteria, (ii) providing the tampering alert criteria to the tamper detection device so that the tamper detection device monitors the communications according to the tampering criteria, and/or (iii) other actions.

Obtaining the tampering criteria may include: (i) reading the tampering criteria from storage, (ii) receiving the tampering criteria from another entity via a communication system (e.g., an out of band communication channel), (iii) generating the tampering criteria based on any number of thresholds, and/or (iv) other methods. Refer to FIG. 2 for additional details regarding the tampering alert criteria.

Providing the tampering alert criteria to the tamper detection device may include encapsulating the tampering alert criteria in a data structure and transmitting the tampering alert criteria to the tamper detection device via a data transmission pathway of the endpoint device (e.g., a side band communication channel).

By doing so, the tamper detection device may monitor at least the communications from the first hardware components and the communications to the second hardware component without the management controller actively monitoring the communications.

At operation 300, a tampering alert may be obtained, the tampering alert indicating an unexpected communication from a first hardware component of hardware resources of an endpoint device. Obtaining the tampering alert may include determining whether characteristics of the unexpected communication match at least a portion of the tampering alert criteria. If the characteristics of the unexpected communication match at least the portion of the tampering criteria, the tampering alert may be generated.

Determining whether the characteristics of the unexpected communication match at least the portion of the tampering criteria may include: (i) obtaining the characteristics of the unexpected communication, (ii) comparing the characteristics of the unexpected communication to the tampering alert criteria, and/or (iii) other methods.

Obtaining the characteristics of the unexpected communication may include: (i) monitoring communications (e.g., data transmissions) traversing a data transmission pathway between the first hardware component and at least the second hardware component, (ii) logging information related to each of the monitored communications, and/or (iii) other methods.

Generating the tampering alert may include: (i) identifying a type of tampering associated with the unexpected communication, (ii) generating a notification indicating the type of the tampering, a timestamp associated with the tampering, and/or other information, and/or (iii) storing a copy of the notification in storage.

At operation 302, interruption of at least the unexpected communication may be initiated in response to the tampering alert. Initiating the interruption of at least the unexpected communication may include: (i) executing instructions to pause standard operation of a device and begin operating in a malicious activity handling mode for the device, (ii) providing instructions to another entity indicating that at least the unexpected communication is to be interrupted, and/or (iii) other methods.

At operation 304, performance of an action set may be initiated, based on a policy keyed to the unexpected communication, to place the hardware resources in a protected state. Initiating performance of the action set may include: (i) obtaining the policy, (ii) obtaining the action set included in the policy, (iii) performing the action set, and/or (iv) other methods. Obtaining the policy may include: (i) reading the policy from storage, (ii) receiving the policy from another entity via a data transmission pathway, (iii) generating the policy, and/or (iv) other methods. Obtaining the action set may include: (i) reading the action set from the policy, the action set being keyed to one or more characteristics of the unexpected communication, (ii) receiving the action set from another entity responsible for managing the policy, and/or (iii) other methods.

Performing the action set may include: (i) logging information related to the unexpected communication, (ii) recovering a prior configuration of a hardware component of the hardware resources impacted by the unexpected communication, (iii) reporting the unexpected communication to a remote server, and/or (iv) other methods.

Logging the information related to the unexpected communication may include: (i) obtaining the information related to the unexpected communication (e.g., contents of the unexpected communication, a timestamp of the unexpected communication, a type of tampering alert criteria violation), (ii) performing a storing process using the information related to the unexpected communication to store the information as an entry in a log, and/or (iii) other methods.

Recovering the prior configuration of the hardware component may include: (i) reading the prior configuration from storage, (ii) receiving the prior configuration from another entity, (iii) executing instructions to modify an existing configuration to restore the prior configuration, (iv) providing instructions to the one or more hardware components to restore the prior configuration, and/or (v) other methods.

Reporting the unexpected communication to the remote server may include: (i) encapsulating the unexpected communication and/or information related to the unexpected communication in a message, (ii) providing the message to the remote server via a communication system, (iii) storing the message in a storage architecture shared with the remote server, and/or (iv) other methods. For example, the message may be provided, via a side band communication channel of the endpoint device, to the management controller of the endpoint device and the management controller may provide the message to the remote server via an out of band communication channel of the endpoint device.

Initiating performance of the action set may also include providing the action set to another entity responsible for performing the action set. Performing the action set may place the hardware resources of the endpoint device in a protected state. The hardware resources may be placed in a protected state due to: (i) increased monitoring of one or more hardware components of the hardware resources, (ii) remediation of malicious activity impacting one or more hardware components of the hardware resources, (iii) modification of configurations of one or more hardware components of the hardware resources to avoid future instances of compromise by malicious entities, and/or (iv) other actions.

The method may end following operation 304.

Therefore, communications between hardware components of endpoint devices may be monitored using out of band methods. By doing so, unexpected communications may be identified and responded to regardless of a state (e.g., a powered state, a compromised state) of the hardware components. In addition, an out of band component (e.g., the tamper detection device) may continue to monitor data transmission pathways to identify unexpected communications when the management controller is inactive. Doing so may increase a likelihood of computer-implemented services being provided by the endpoint devices as desired by downstream consumers of the computer-implemented services.

Figure 4:
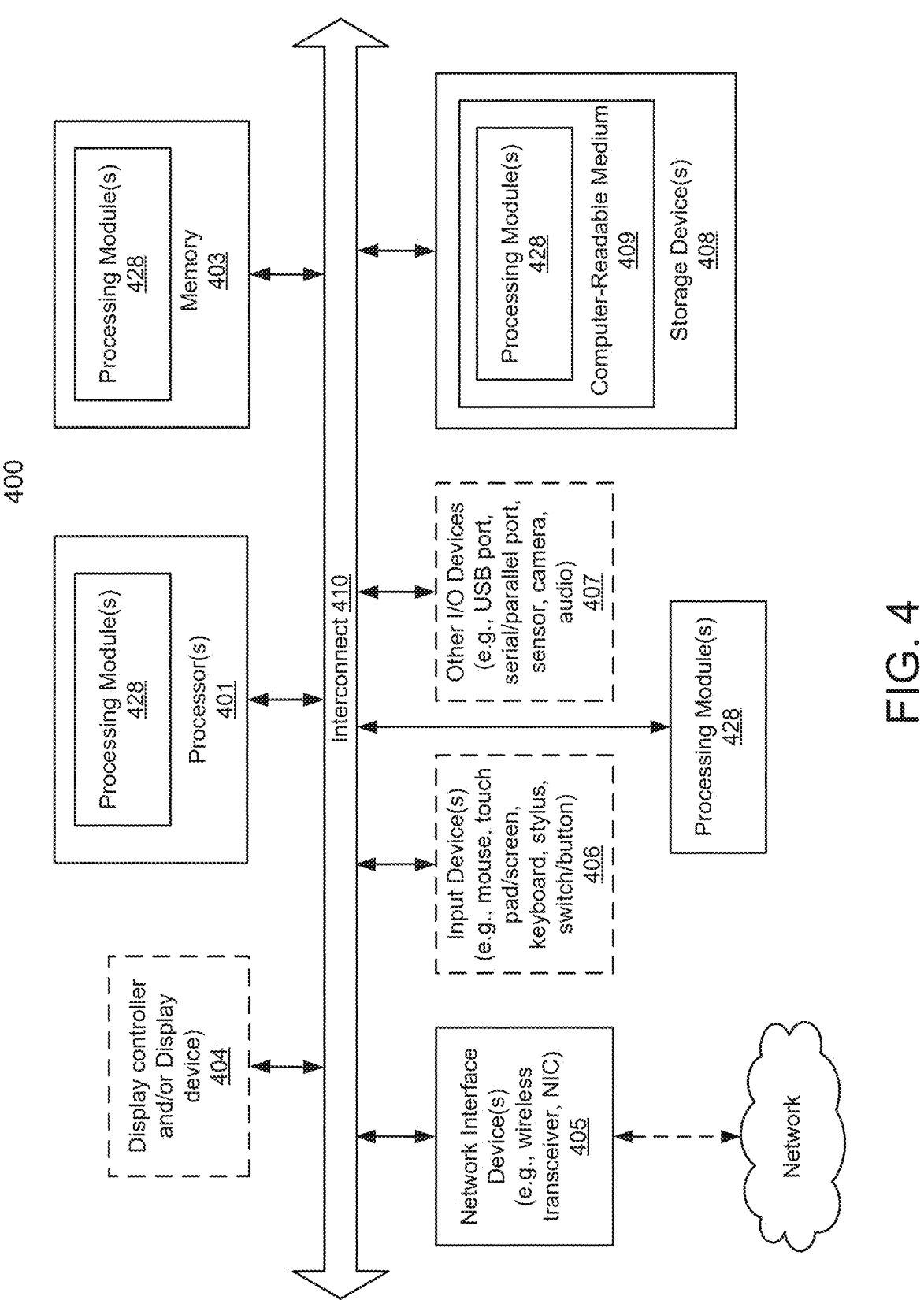
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing security for an endpoint device, the method comprising:

obtaining, by a tamper detection device of the endpoint device, a tampering alert indicating an unexpected communication from a first hardware component of hardware resources of the endpoint device, the tamper detection device being:

managed by a management controller of the endpoint device, and configured to monitor communications from the first hardware component and to a second hardware component of the hardware resources of the endpoint device;

initiating, by the tamper detection device and in response to the tampering alert, interruption of at least the unexpected communication; and initiating, by the tamper detection device and based on a policy keyed to the unexpected communication, performance of an action set to place the hardware resources in a protected state, wherein the endpoint device comprises a network module adapted to separately advertise network endpoints for the management controller and hardware resources of the endpoint device, the network endpoints being usable by a remote server to address communications to the hardware resources and the management controller.

2. The method of claim 1, further comprising:

prior to obtaining the tampering alert:

obtaining, by the management controller of the endpoint device, tampering alert criteria; and providing, by the management controller, the tampering alert criteria to the tamper detection device so that the tamper detection device monitors the communications from the first hardware component and to the second hardware component according to the tampering alert criteria.

3. The method of claim 2, wherein the tamper detection device monitors the communications from the first hardware component and to the second hardware component while the management controller is inactive.

4. The method of claim 2, wherein obtaining the tampering alert comprises:

making a determination regarding whether characteristics of the unexpected communication match at least a portion of the tampering alert criteria; and in an instance of the determination in which the characteristics of the unexpected communication match at least the portion of the tampering alert criteria:

generating the tampering alert.

5. The method of claim 2, wherein the tamper detection device is a serial communication tamper detector configured to monitor communications traversing a serial communication bus of the endpoint device.

6. The method of claim 5, wherein the tampering alert criteria indicate at least one condition selected from a list of conditions consisting of:

a threshold of clock counts for the serial communication bus; and a bit pattern associated with a command traversing the serial communication bus.

7. The method of claim 2, wherein the tamper detection device is a general-purpose input/output (GPIO) tamper detector configured to monitor an output pin of a GPIO of the endpoint device.

8. The method of claim 7, wherein the tampering alert criteria indicate an expected output of the output pin of the GPIO.

9. The method of claim 8, wherein a first rate of tampering alert criteria violation indicates interference by a malicious entity and a second rate of tampering alert criteria violation indicates a defective hardware component of the hardware resources, the first rate of tampering alert criteria violation being higher than the second rate of tampering alert criteria violation.

10. The method of claim 1, wherein initiating performance of the action set comprises performing at least one action selected from a list of actions consisting of:

logging information related to the unexpected communication;

recovering a prior configuration of a hardware component of the hardware resources impacted by the unexpected communication; and reporting the unexpected communication to the remote server.

11. The method of claim 1, wherein the management controller and the network module are on separate power domains from the hardware resources so that the management controller and the network module are operable while the hardware resources are inoperable.

12. The method of claim 1, wherein an out of band communication channel that services the management controller runs through the network module, and an in band communication channel that services the hardware resources also runs through the network module.

13. The method of claim 12, wherein the network module hosts a transmission control protocol/internet protocol (TCP/IP) stack to facilitate network communications via the out of band communication channel.

14. A non-transitory machine-readable medium having instructions stored therein, which when executed by a processor, cause the processor to perform operations for managing security for an endpoint device, the operations comprising:

obtaining, by a tamper detection device of the endpoint device, a tampering alert indicating an unexpected communication from a first hardware component of hardware resources of the endpoint device, the tamper detection device being:

managed by a management controller of the endpoint device, and configured to monitor communications from the first hardware component and to a second hardware component of the hardware resources of the endpoint device;

initiating, by the tamper detection device and in response to the tampering alert, interruption of at least the unexpected communication; and initiating, by the tamper detection device and based on a policy keyed to the unexpected communication, performance of an action set to place the hardware resources in a protected state, wherein the endpoint device comprises a network module adapted to separately advertise network endpoints for the management controller and hardware resources of the endpoint device, the network endpoints being usable by a remote server to address communications to the hardware resources and the management controller.

15. The non-transitory machine-readable medium of claim 14, wherein the operations further comprise:

prior to obtaining the tampering alert:

obtaining, by the management controller of the endpoint device, tampering alert criteria; and providing, by the management controller, the tampering alert criteria to the tamper detection device so that the tamper detection device monitors the communications from the first hardware component and to the second hardware component according to the tampering alert criteria.

16. The non-transitory machine-readable medium of claim 15, wherein the tamper detection device monitors the communications from the first hardware component and to the second hardware component while the management controller is inactive.

17. A data processing system, comprising:

a processor; and a memory coupled to the processor to store instructions, which when executed by the processor, cause the processor to perform operations for managing security for an endpoint device, the operations comprising:

obtaining, by a tamper detection device of the endpoint device, a tampering alert indicating an unexpected communication from a first hardware component of hardware resources of the endpoint device, the tamper detection device being:

managed by a management controller of the endpoint device, and configured to monitor communications from the first hardware component and to a second hardware component of the hardware resources of the endpoint device;

initiating, by the tamper detection device and in response to the tampering alert, interruption of at least the unexpected communication; and initiating, by the tamper detection device and based on a policy keyed to the unexpected communication, performance of an action set to place the hardware resources in a protected state, wherein the endpoint device comprises a network module adapted to separately advertise network endpoints for the management controller and hardware resources of the endpoint device, the network endpoints being usable by a remote server to address communications to the hardware resources and the management controller.

18. The data processing system of claim 17, wherein the operations further comprise:

prior to obtaining the tampering alert:

obtaining, by the management controller of the endpoint device, tampering alert criteria; and providing, by the management controller, the tampering alert criteria to the tamper detection device so that the tamper detection device monitors the communications from the first hardware component and to the second hardware component according to the tampering alert criteria.

19. The data processing system of claim 18, wherein the tamper detection device monitors the communications from the first hardware component and to the second hardware component while the management controller is inactive.

20. The data processing system of claim 17, wherein initiating performance of the action set comprises performing at least one action selected from a list of actions consisting of:

logging information related to the unexpected communication;

recovering a prior configuration of a hardware component of the hardware resources impacted by the unexpected communication; and reporting the unexpected communication to a remote server.

* * * * *